Patented Apr. 1, 1930

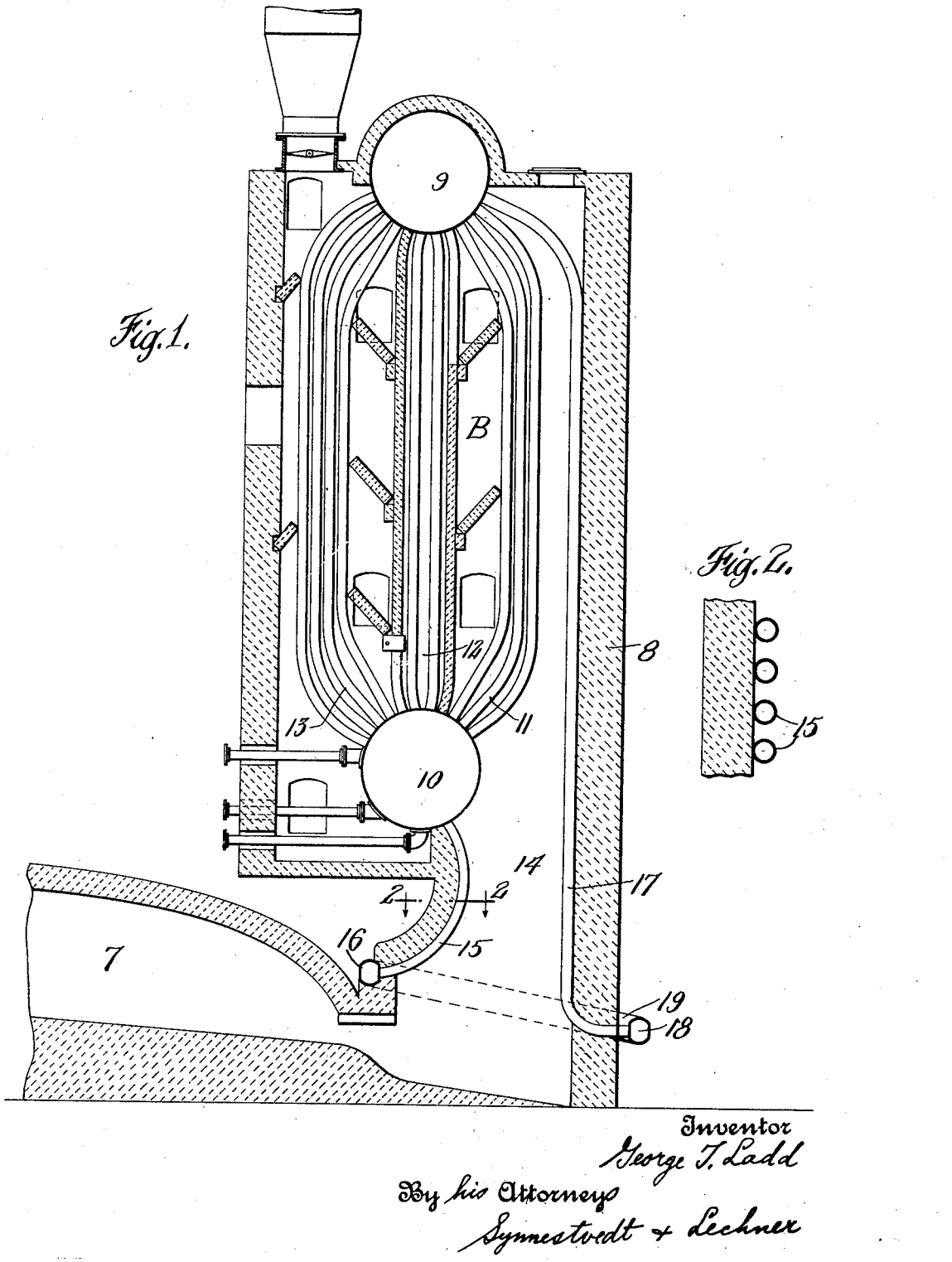

1,752,673

UNITED STATES PATENT OFFICE

GEORGE T. LADD, OF PITTSBURGH, PENNSYLVANIA, ASSIGNOR TO LADD WATER TUBE BOILER COMPANY, OF NEW YORK, N. Y., A CORPORATION OF DELAWARE

WASTE-HEAT BOILER

Application filed March 26, 1926. Serial No. 97,504.

This invention relates to waste heat boilers, and one of the primary objects of the invention is to provide a novel arrangement of evaporating elements connected into the circulation of the boiler for the purpose of preventing the accumulation of objectionable deposit on the refractory structure while, at the same time, increasing the steaming capacity of the boiler. The foregoing, together with such other objects as may hereinafter appear, are illustrated in preferred form in the accompanying drawing, wherein—

Fig. 1 is a vertical section through a waste heat boiler embodying my improvements, and Fig. 2 is a fragmentary section taken on the line 2—2 of Fig. 1.

Referring to the drawings, the reference numeral 7 indicates a metallurgical or other heating furnace from which the waste heat is derived for generating the steam in the boiler indicated as a whole by the reference character B, which boiler is located in the off-take 8 from the furnace 7.

The boiler comprises an upper drum 9 and a lower drum 10, and the banks of vertical tubes 11, 12 and 13 baffled to provide three passes. The boiler is thus a compact structure well adapted for the use of waste heat for the generation of steam. The brickwork at the throat 14 of the offtake is subjected to the scouring action of the waste gases leaving the furnace 7, and is eroded, in addition to which the waste gases usually carry solid matter forming an objectionable gummy deposit which builds up on the refractories and chokes the passage. To overcome these difficulties I provide a plurality of spaced downcomer tubes 15 leading from the drum 10 to the header 16, and a plurality of spaced upcomer tubes 17 leading from the header 18 to the upper drum 9. The tubes 15 chill the solid particles as they lodge and they thereby do not accumulate, but fall down, and they also serve to protect that portion of the brickwork immediately beneath the drum 10 by virtue of the fact that such tubes absorb a large amount of heat. The tubes 17 function similarly, both as to chilling the solid particles leaving the gases and as to protecting the outer upright wall of the offtake, and cooperate with the tubes 11 to provide a tube lined channel for the gases rising upwardly from the throat of the off-take. The circulatory system is completed by means of the large pipe 19 which connects the headers 16 and 18. This pipe is preferably located exterior of the off-take, and is of ample size, so that a downward circulation is insured through the pipes 15.

It will be apparent that the tubes 15 and 17, in addition to protecting the refractory structure, add greatly to the steaming capacity of the boiler. They also make it possible for the same capacity to reduce the number of tubes, and, therefore, the size of the boiler proper. They add to the efficiency of the installation as a whole, for the reason that heat is being absorbed practically from the exit end of the furnace 7.

What I claim is:—

In combination, a furnace from which waste heat is to be derived, an off-take therefor having a throat, a boiler in the off-take above the throat including an upper drum and a lower drum and connecting vertically disposed tubes, downcomer tubes within the throat and leading from the lower drum downwardly, a header for said tubes located exterior of the throat, upcomer tubes within the off-take connected to the upper drum at one end, a header to which the other ends of said tubes are connected, and means for connecting the headers.

In testimony whereof I have hereunto signed my name.

GEO. T. LADD.